June 19, 1951  F. TURRETTINI  2,557,582
DEVICE FOR CLAMPING TOOLS
Filed April 29, 1947  2 Sheets-Sheet 1

INVENTOR
Fernand Turrettini
By Robert E. Burns
ATTORNEY

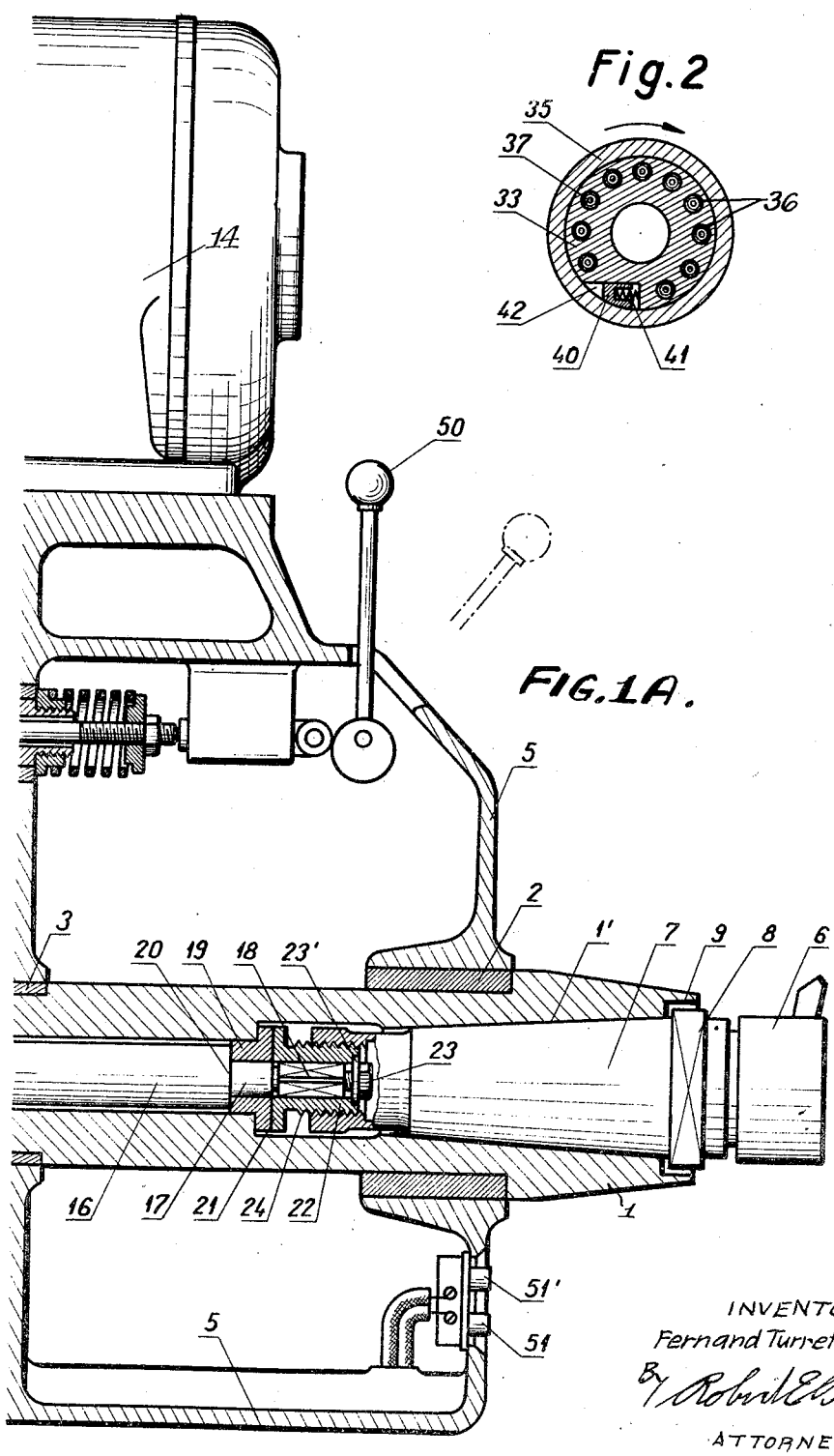

UNITED STATES PATENT OFFICE 2,557,582

DEVICE FOR CLAMPING TOOLS

Fernand Turrettini, Geneva, Switzerland, assignor to Societe Genevoise D'Instruments de Physique, Geneva, Switzerland, a firm of Switzerland Application April 29, 1947, Serial No. 744,558
In Switzerland May 3, 1946

9 Claims. (Cl. 90—11)

The clamping of tools on rotary machine tool spindles such as milling and boring machines, is, generally speaking, obtained by a clamping taper, e. g. a Morse taper or the like, permitting accurate centering as well as rigid clamping of the tool on the spindle.

Various means have heretofore been used in order to clamp and then release the tool.

The most commonly used device consists of a clamping bar which extends the whole length of the spindle and screws into the shaft of the tool. This bar must be screwed in and screwed out by hand, generally by gripping its extremity opposite to the tool, a procedure which absorbs a considerable amount of time, especially if the spindle arrangement is such as to compel the operator to change his position.

In order to reduce to a minimum the idle time of the machine, devices have been proposed to permit changing the tool in a minimum of time by applying a simplified tool-holding system operated either by hand or automatically, as well as a braking device which stops the spindle quickly.

An object of the present invention is to provide a device intended to clamp and release the tools on the rotative spindle of a machine tool, including a draw-in bar provided with a screw thread arranged concentrically to the spindle and cooperating with a screw thread provided on the tools to be clamped. The device in accordance with the invention is characterized by a transmission mechanism connecting the draw-in bar to the spindle-driving motor so that, when the spindle is thrown out of gear, the motor acts on the draw-in bar through a coupling and, according to its direction of rotation, effects the clamping or the releasing of the tools.

The accompanying drawings illustrate, by way of example, a preferred embodiment of this device.

In the drawings:

Figs. 1 and 1A are together a longitudinal section of the spindle.

Fig. 2 illustrates a cross-section of a detail of design taken approximately on the line II—II in Fig. 1.

Figure 1:
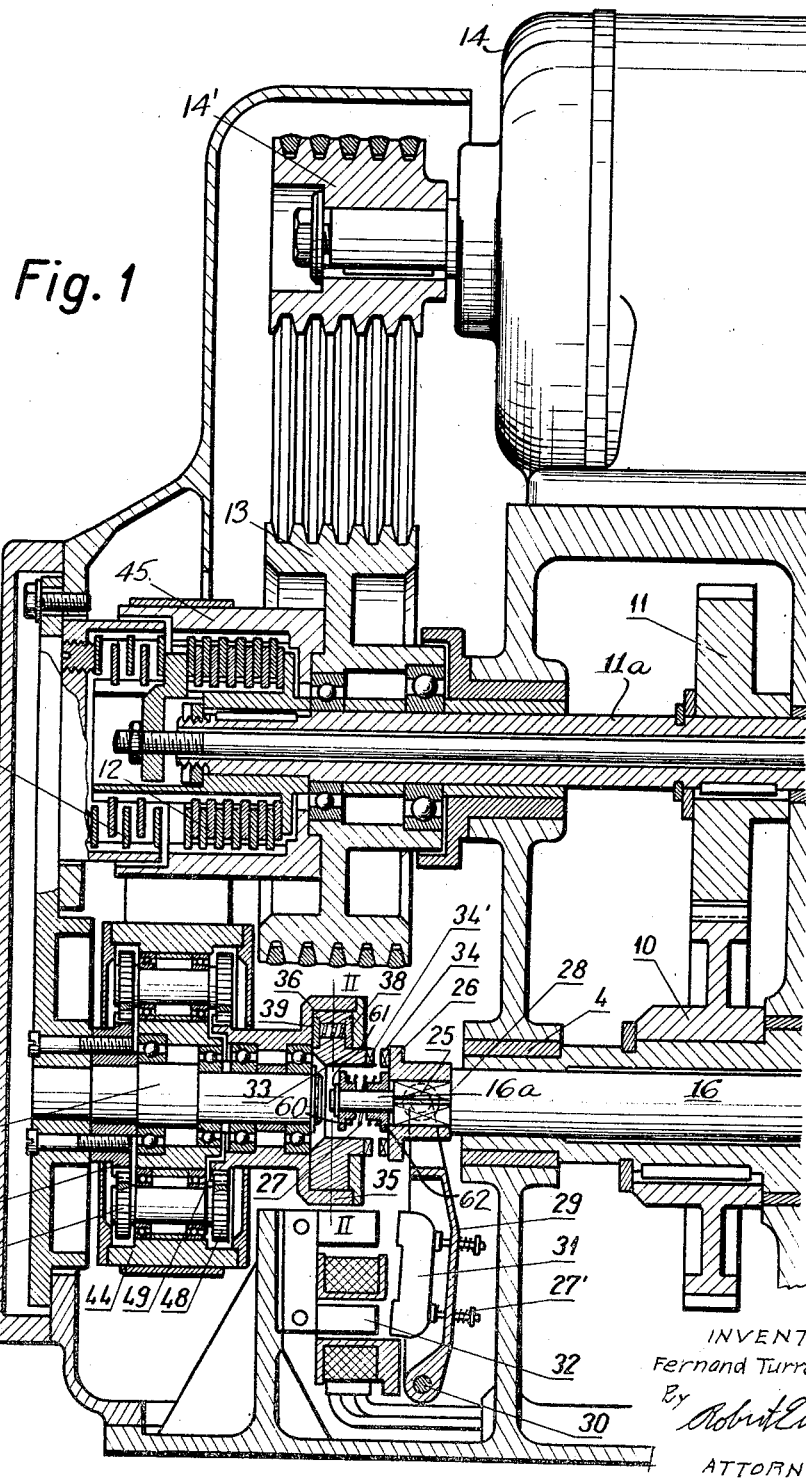

In the embodiment illustrated in the drawings, the spindle 1, running in bearings 2, 3, 4 of the housing 5, is adapted to receive the tool 6 at its right hand extremity. The shaft of the tool is provided with a taper portion 7, intended to fit into a corresponding conical recess 1' of the spindle and a square portion 8 fitting in a recess 9 of the spindle. A transmission for driving the spindle at various speeds of rotation is diagrammatically represented by a single pair of gears 10 and 11 mounted respectively on the spindle 1 and a drive shaft 11a. A double-acting disc clutch 12 permits the shaft 11a to be coupled either with a pulley 13 driven by motor 14 and pulley 14' to produce rotation of the spindle, or with a brake 15 rigidly secured to the housing 5 for quickly stopping and immobilizing the spindle to change the tool.

Internally of the spindle and coaxial therewith, a draw-in bar 16 is so arranged that it can rotate but cannot slide axially. Its right hand end is provided with a machined portion 17 and a square 18. A stopping ring 19, fixed on the spindle by means not shown, stops axial movement of the bar 16 in both directions, cooperating on one side with the shoulder 20 of the bar and, on the other side, with the face 21 of a screw-threaded ring 22 mounted on the square 18 and retained by screw 23 and washer 23'. The ring 22 has an external screw thread 24 adapted to screw into a tapped hole provided in the tool shaft for that purpose.

At the opposite end of bar 16, there is a square 25, on which a sliding sleeve 26 is mounted, and a reduced end portion 16a. A compression spring 27 mounted on the end portion 16a of bar 16 bears at one end against a collar 60 seated on an abutment 61 secured to the end of the portion 16a and at the opposite end presses against a collar 62 which is slidable on the portion 16a and bears on the sliding sleeve 26. Thus, spring 27 constantly tends to push the sleeve 26 against shoulder 28 of the bar 16. Sleeve 26 is operated by a lever 29, pivoted at 30 and resiliently coupled by means of springs 27' to the armature 31 of an electromagnet of which the core 32 is fastened onto the housing 5 of the spindle. The electromagnet and the springs 27 and 27' are computed in such a way that when the electromagnet is energized the armature slides sleeve 26 along the square by means of lever 29 overcoming the action of spring 27. In this position, sleeve 26 and ring 33 are coupled together by teeth 34 on sleeve 26 and teeth 34' on ring 33 being in mesh. When the electric current is cut off in the electromagnet, its action on the lever ceases and spring 27 again pushes the sleeve against shoulder 28 of the bar, thus releasing the coupling. Ring 33 is centered in a cup-shaped driver 35 and coupled to the latter by a friction clutch constituted by a series of springs 36 located in recesses 37 (Fig. 2) of ring 33 and acting through appropriate friction members on both faces 38 and 39 of driver 35. A wedge 40 (Fig. 2), biased by a spring 41, is located in a recess 42 provided at the periphery of the ring to prevent its sliding with respect to the driver when the latter rotates in the direction indicated by the arrow. By this arrangement of the clutch, it is possible to transmit to the bar 16, in one direction, a couple limited by the power of the springs 36 for the clamping of the tool, and, in the opposite direction, a maximum couple for its release.

The driver 35, mounted at the end of a shaft 43, is operatively connected to the driving motor of the spindle by means of a planetary speed reducer 44 so that it revolves with reduced speed. In the example illustrated, the periphery of this speed reducer is rim-shaped to be driven by means of a belt by pulley 45 rigid with pulley 13, the latter being belt-driven by the pulley 14' of spindle motor 14. By its rotation, the body of the speed reducer 44 drives satellite pinions 46 meshing with a fixed gear wheel 47. Opposite satellite pinions 48 rotate with the same speed as the pinions 46, on which they are dependent, and are in mesh with the toothed wheel 49, rigid with driver 35. The reduction ratios between the toothed wheels 47, 49 and the satellite pinions 46, 48 are chosen in such a way as to reduce the speed of driver 35 sufficiently to prevent a too sudden coupling action which would prove detrimental to the entire mechanism.

For clamping a tool 6, a convenient handle 50 controlling the disc coupling clutch 12 and the brake 15 is operated so as to release and stop the spindle. The pulleys 13 and 45, and the speed reducer 44 continue to rotate as do also the driver 35 and ring 33. These latter components, however, rotate with reduced speed. Now taper 7 of the tool is introduced into the spindle taper 1', the rectangle 8 penetrating in the corresponding recess 9 of the spindle nose. At this precise moment, a push-button 51 is operated to energize the electromagnet and thereby actuate the lever 29 to slide the sleeve 26 along square 25 into engagement with ring 33. The latter thus transmits its rotational motion to bar 16. The direction of the screw thread is such that, by this rotation, the ring nut 22 penetrates into the tapped hole provided in the shaft of the tool, pulling the latter quickly inside for tightening it in the taper 1' of the spindle. As soon as the clamping takes place, the bar as well as the sleeve 26 and the ring 33 are immobilized. The above described friction clutch goes into action, limiting the couple transmitted to the draw-in bar. The push-button 51 is now released to de-energize the electromagnet, whereupon the spring 27 drives back sleeve 26 and releases rod 16. The ring 33 again starts its rotational motion, being operated by the driver 35. The spindle being now ready for working, the lever 50 is operated to engage the clutch and thereby connect the spindle with the spindle motor 14.

To release the tool, the spindle is immobilized by operating lever 50 and the operator then pushes a releasing push-button 51' which reverses the direction of rotation of the spindle motor and energizes the electromagnet to effect, as previously, the coupling of bar 16 with the driver 35. Due to the fact that the releasing of the tool may require a relatively substantial effort, it is advisable to exert on the bar a maximum couple which is greater than that provided by the friction clutch of ring 33. As already mentioned, this is obtained by means of wedge 40 (Fig. 2) which compels ring 33 to rotate together with driver 35 in this direction of rotation. The couple transmitted to bar 16 is moreover subject to a proportional increase with respect to the reduction ratio of the speed reducer. The tool having been withdrawn and released by this rotation of the screw-threaded bar, the push-button 51' is now released to release the bar 16, and the spindle motor 14 stops.

In the embodiment of the invention which has been described, the coupling of the draw-in bar 16 with the driving element 33 is obtained by the cooperating action of an electromagnet and of an opposing spring. It will be readily understood that any other equivalent means could be applied, such as hydraulic or pneumatic means with remote control.

What I claim is:

1. In a machine tool, the combination comprising a spindle for receiving a tool, means for driving said spindle, first means for coupling said spindle to said driving means, a brake for said spindle, means for controlling said coupling and said brake for effecting a disengagement and a stoppage of said spindle for the purpose of tool changing, a draw-in member disposed for rotation within said spindle having a portion formed to engage a tool, means for rotating said member including means for operatively linking said rotating means to driving means, second means for coupling said rotating means to said member, and means for actuating said second coupling means.

2. The combination according to claim 1, wherein said first coupling means includes a clutch mechanism.

3. The combination according to claim 1, wherein said first coupling means includes a clutch and said controlling means comprises a lever mechanism for actuating said clutch and said brake.

4. The combination according to claim 1, wherein said rotating means includes a speed reducer.

5. The combination according to claim 1, wherein said second coupling means includes a second clutch.

6. The combination according to claim 5, wherein said second clutch includes automatic stopping means limiting the torque from said rotating means to said member in one direction and for transmitting a maximum turning moment in the other direction.

7. The combination according to claim 1, wherein said actuating means includes an electromagnetic mechanism.

8. The combination according to claim 1, further including means for reversing the operative sense of direction of said driving means.

9. The combination according to claim 1, wherein said actuating means includes an electromagnetic mechanism further including a control comprising two push buttons for controlling respectively said electromagnetic mechanism and the reversing of said driving means.

FERNAND TURRETTINI.

REFERENCES CITED

The following references are of record in the file of this patent:

UNITED STATES PATENTS

| Number | Name | Date |
| --- | --- | --- |
| 2,441,046 | Turrettini | May 4, 1948 |